United States Patent [19]

Greeley

[11] Patent Number: 4,473,409
[45] Date of Patent: Sep. 25, 1984

[54] APPARATUS AND METHOD FOR CLEANING VEHICLE INTERIORS

[76] Inventor: Jackie D. Greeley, 316 Sleepy Meadow, Anaheim, Calif. 92807

[21] Appl. No.: 384,270

[22] Filed: Jun. 2, 1982

[51] Int. Cl.³ ............................ B60S 3/00; B08B 5/04
[52] U.S. Cl. ........................................ 134/21; 15/301; 15/312 R; 15/314
[58] Field of Search ................ 15/300 A, 300 R, 304, 15/310, 312 R, 313, 314, 315, 316 R, 345, 346; 134/21, 22 R, 37

[56] References Cited
U.S. PATENT DOCUMENTS

| | | | |
|---|---|---|---|
| 2,299,987 | 10/1942 | Hunter | 15/345 X |
| 2,677,629 | 5/1954 | Buck | 15/314 X |
| 3,000,037 | 9/1961 | Marlo et al. | 15/315 |
| 4,115,896 | 9/1978 | Costanzo | 15/301 |

FOREIGN PATENT DOCUMENTS

| | | | |
|---|---|---|---|
| 961995 | 6/1964 | United Kingdom | 15/312 R |
| 970088 | 9/1964 | United Kingdom | 15/312 R |
| 1025659 | 4/1966 | United Kingdom | 15/301 |

Primary Examiner—Chris K. Moore
Attorney, Agent, or Firm—Knobbe, Martens, Olson & Bear

[57] ABSTRACT

A pair of flexible sealing members connected to a housing adjacent an intake chamber to engage and form a seal with interior portions of a door opening of a vehicle is provided. This air-sealed engagement permits an orderly and efficient flow of air between the interior portions of the vehicle and the intake chamber when air is evacuated from the housing. The resulting air flow through the interior of the vehicle removes dust and debris therefrom.

17 Claims, 8 Drawing Figures

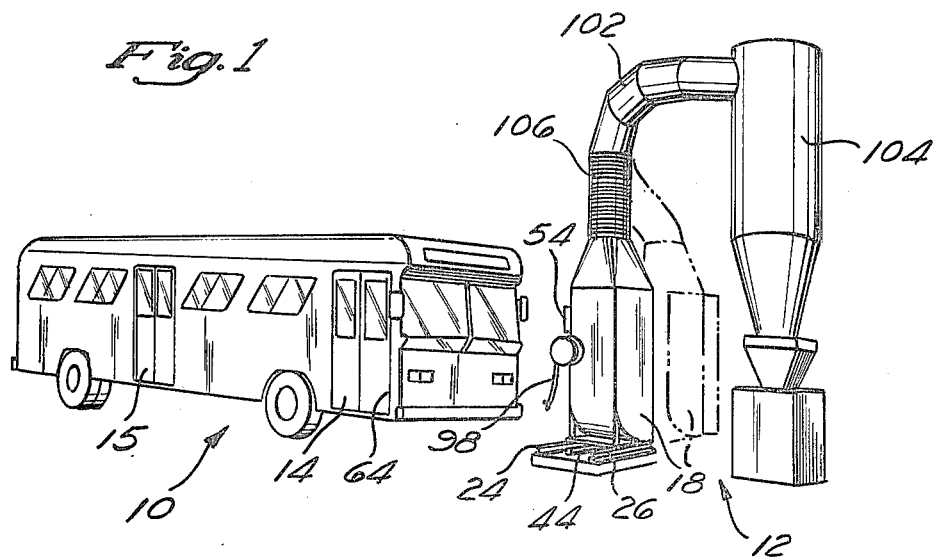
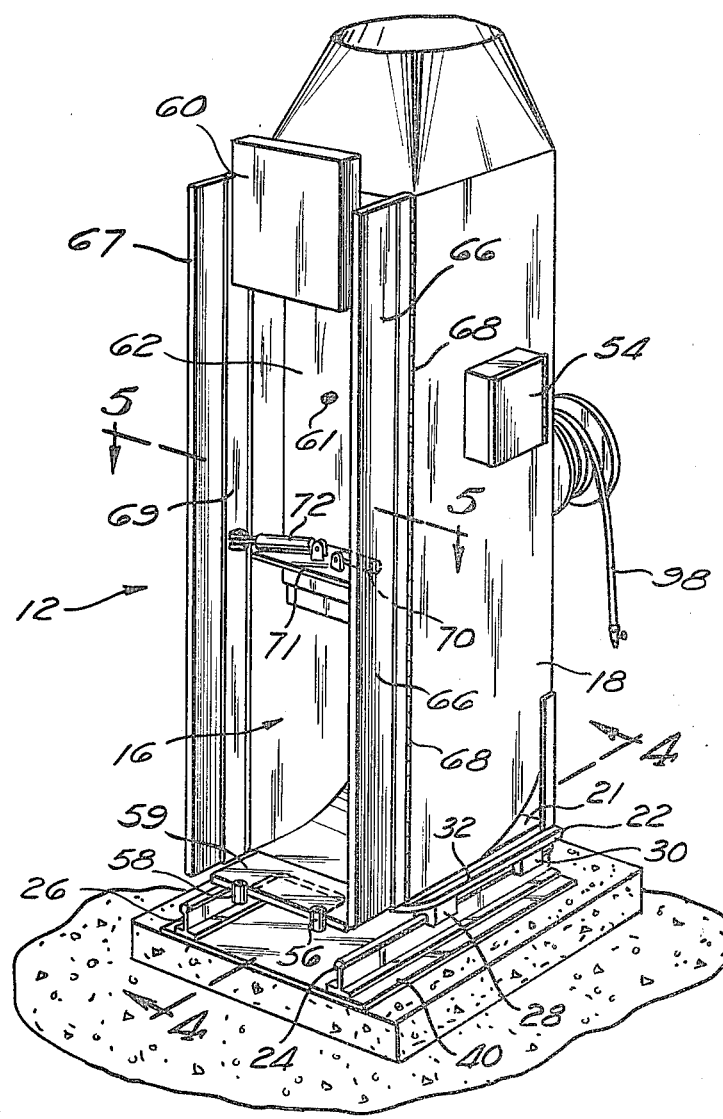

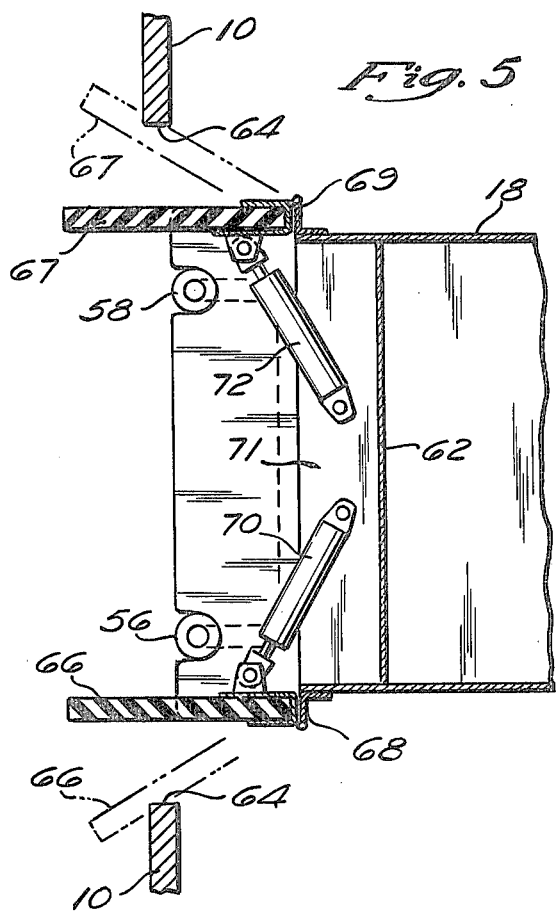
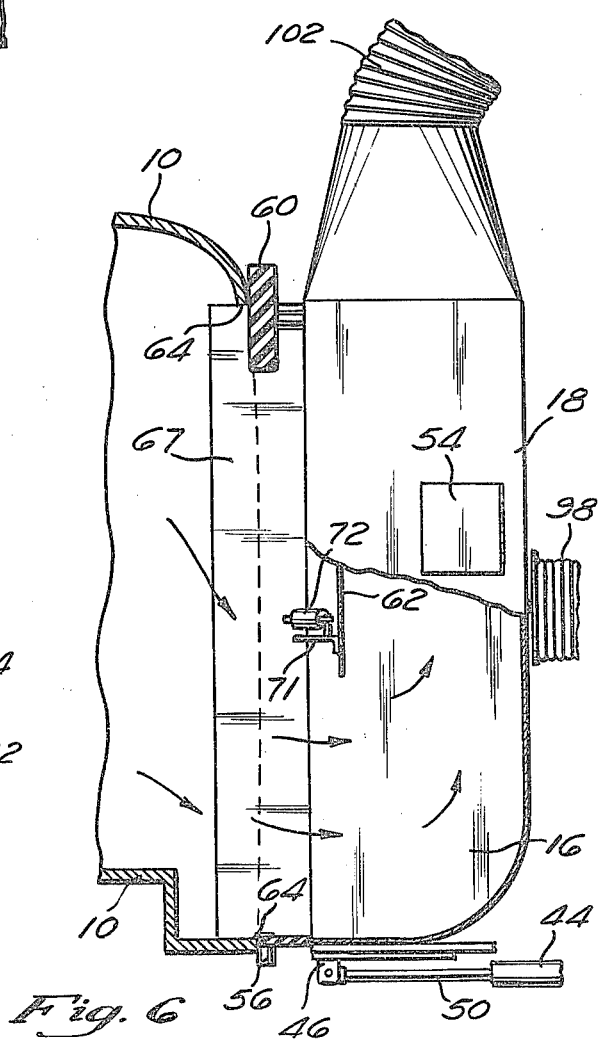
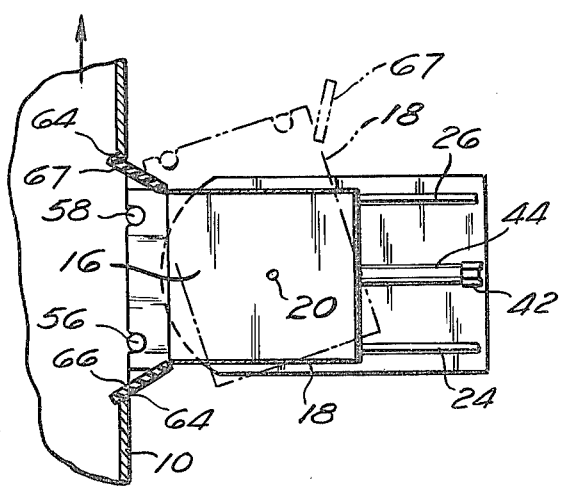

APPARATUS AND METHOD FOR CLEANING VEHICLE INTERIORS

BACKGROUND OF THE INVENTION

This invention relates generally to systems for forcing a high velocity air flow through an enclosure such as the interior of a bus or other vehicle for removing dirt and trash therefrom. More particularly, the invention relates to a system which includes a pneumatically controlled bellows for engaging a bus door or bus door opening to place the interior of the bus in communication with a housing containing a fan for drawing air through the bus to carry dirt and trash from the bus interior to the housing.

Prior art bus cleaning systems include a frame which fits over a bus door opening. Such frames are unuseable with certain types of bus doors, particularly those which open outwardly.

Accordingly, there is a need in the art for a system for cleaning vehicles such as buses with the cleaning system being useable with any of the bus doors or bus door openings currently in use.

SUMMARY OF THE INVENTION

The present invention includes a pair of normally closed bellows members attached to a housing adjacent an intake chamber. The housing is mounted on rails in order to insert the sealing members into an open bus door opening. A pneumatic control system controls the position of the housing on the rails and opens the sealing members against the open door, or door opening depending upon the structure of the door, to form a seal so that air may be drawn through a second door at the opposite end of the bus to blow dust and debris out of the bus into the intake chamber.

The system includes a start switch which is preferably located just above the opening into the intake chamber so that if the bus is positioned in alignment with the intake opening and adjacent the housing, an operator may operate the system from inside the bus. The pneumatic control system includes logic circuitry which first moves the sealing members inside the bus door opening and then opens the sealing members into contact with the bus door opening. The sealing members begin to open either after the control logic detects a predetermined pressure between the housing and the bus or after the housing has moved a maximum permissible distance along the rails toward the bus.

After the bus and sealing members are properly engaged, the operator turns on a fan which creates a high-velocity stream of air through the bus, which carries dust and other debris out of the bus into the housing.

The system may in addition include a high-pressure hose connected to a suitably high-pressure source of air so that an operator may direct a stream of compressed air on interior surfaces of the bus to dislodge dust and dirt therefrom.

The invention may include upper and lower bumpers which engage the upper and lower portions of the bus door opening to prevent damage to the bus and to prevent injury to a person who may be inadvertently caught between the housing and the bus. The sealing members are preferably constructed of a flexible material to conform to the shapes of surfaces against which the sealing members are pressed. The pneumatic control system pushes the bumpers against the bus and opens the sealing members against the bus door opening with forces which provide adequate sealing but which are low enough to prevent injury to persons which may be between the bus cleaning apparatus and the bus.

The housing is preferably pivotally mounted on a plate so that the housing rotates to disengage the sealing members from the bus if the bus should move forward or backward. A shear pin retains the housing against rotation when a torque less than a predetermined value acts upon the housing about the pivotal mounting.

BRIEF DESCRIPTION OF THE DRAWINGS

FIG. 1 is a perspective view of a bus approaching the bus cleaning apparatus according to the invention;

FIG. 2 is a perspective view of the invention;

FIG. 5 is a cross sectional view taken along line 5—5 of FIG. 2;

FIG. 6 is a side elevation view;

FIG. 7 is a plan view of the invention; and

DESCRIPTION OF THE PREFERRED EMBODIMENT

Figure 3:
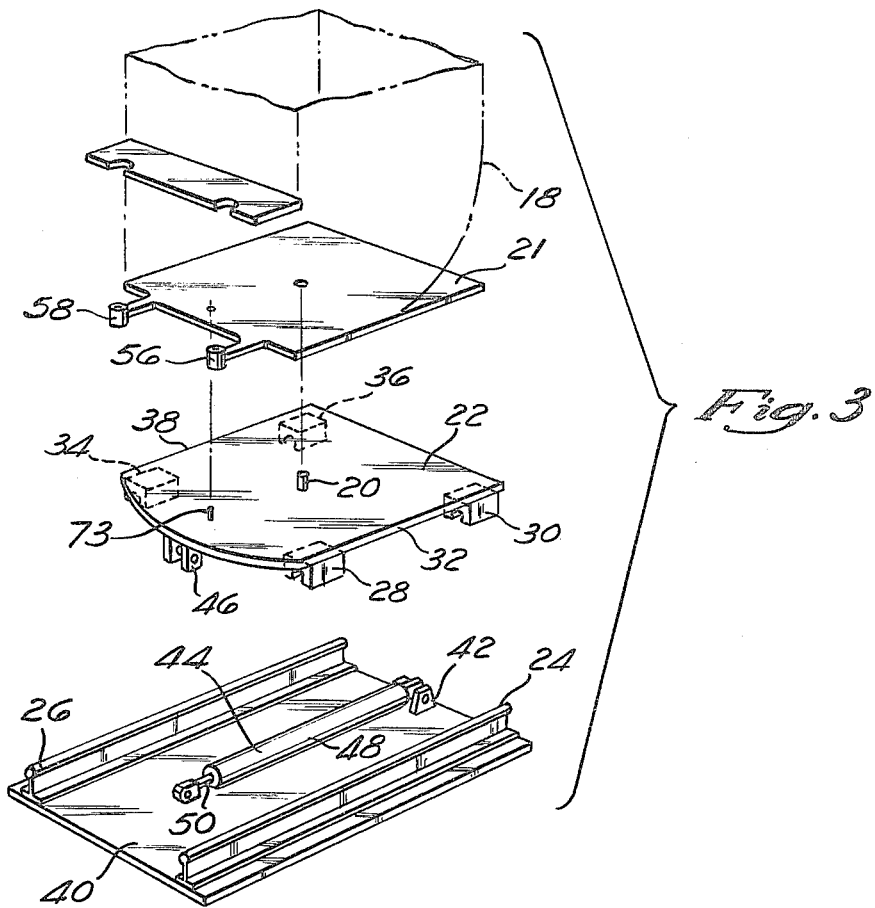
FIG. 3 is an exploded perspective view of a portion of the invention.

FIG. 1 shows a bus 10 approaching a bus cleaning system 12 according to the invention. The bus 10 is positioned for cleaning such that a door 14, preferably near the front of the bus 10, is in alignment with an intake opening 16 shown in FIG. 2 in a housing 18. The bus 10 normally has a rear door 15.

Figure 4:
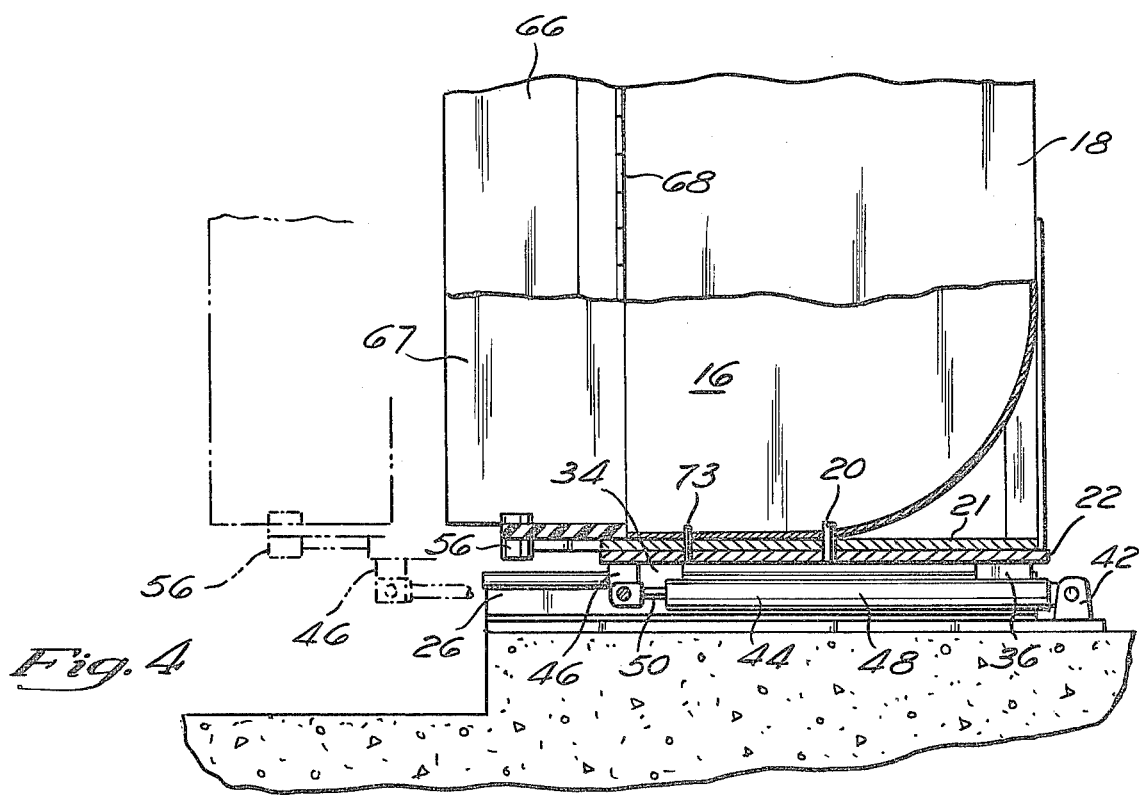
FIG. 4 is a partial cross sectional view taken along line 4—4 of FIG. 2.

Referring to FIGS. 3, 4 and 7, a pivot pin 20 provides means for pivotally mounting a floor plate 21 of the housing 18 on a plate 22. The plate 22 is mounted on a pair of rails 24 and 26 for movement thereon. Suitable means for mounting the plate 22 to the rails 24 and 26 may include a first pair of bearing assemblies 28 and 30 fixed to a side 32 of the plate 22 for engagement with the rail 24 and a second pair of bearing assemblies 34 and 36 fixed to a side 38 of plate 22 for engagement with the rail 26. The rails 24 and 26 are fixed by any suitable means, such as welding, to a base 40.

A bracket 42 extends from the base 40 and provides means for connecting a dual action linear actuator 44, preferably pneumatically controlled, to the base 40. As shown in FIG. 4, a second bracket 46 extends from the plate 22 to provide means for connecting the dual action linear actuator 44 thereto. In the illustrated embodiment, the dual action linear actuator 44 has an actuator housing 48 connected to the bracket 42 and an actuator rod 50 connected to the bracket 56.

Figure 8:
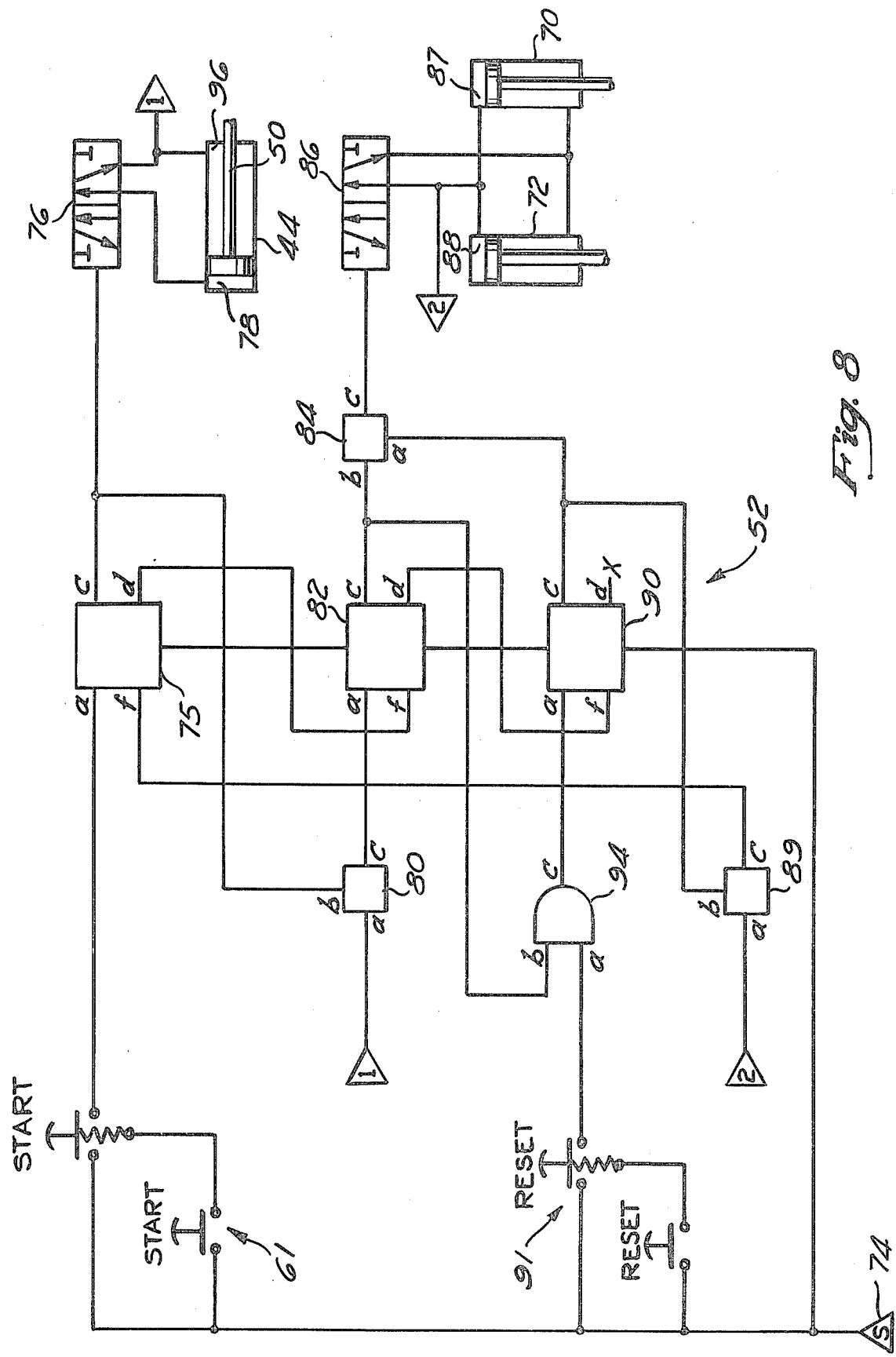
FIG. 8 is a block diagram of the pneumatic control system of the invention.

A pneumatic control system 52 shown in FIG. 8, located in a control housing 54 provides pneumatic pressure to the dual action linear actuator 44 to control movement of the housing 18 along the rails 24 and 26.

A pair of lower bumpers 56 and 58 are attached to a plate 59 which extends from the plate 21 below the intake opening 16, and an upper bumper 60 is attached to the upper portion of the housing 18. As shown in FIG. 6, the lower bumpers 56 and 58 and the upper bumper 60 contact bus 10 at the upper and lower portions of a bus door opening 64, respectively, when the housing 18 is in position for the cleaning bus 10.

Referring to FIG. 2, in order to use the bus cleaning system 12, an operator positions the bus 10 such that the bus door opening 64 is in alignment with the intake opening 16 and preferably within less than a predetermined distance, related to the range of movement of housing 18 along rails 24 and 26 from the bus cleaning system 12. To initiate the cleaning action, the operator actuates a start switch 61 located in a panel 62 above intake opening 16 of the housing 18. The start switch 61 is accessible to the operator from the interior of the bus 10 if the bus door 14 is open while the bus 10 is properly positioned relative to the intake opening 16. Actuation of the switch 61 causes the pneumatic control system 52 to move the housing 18 forward along the rails 24 and 26 until the lower bumpers 56 and 58 and the upper bumper 60 contact the bus 10 or until the housing 18 has traveled a predetermined maximum permissible distance along the rails 24 and 26.

Referring to FIGS. 2, 5 and 7, a pair of sealing flaps or members 66 and 67 are connected to the housing 18 in alignment with the sides of intake opening 16. A pair of hinges 68 and 69 pivotally mount the sealing members 66 and 67, respectively, to the housing 18. The sealing members 66 and 67 are normally in a closed position. A dual action linear actuator 70, preferably pneumatically controlled, mounted between the sealing member 66 and a panel 71 which extends from the panel 62 controls the angular position of the bellows member 66 relative to the housing 18. Similarly, a dual action linear actuator 72, also preferably pneumatically controlled, connected between the sealing member 67 and the housing 18 controls the angular position of the sealing member 67 relative to the housing 18. Both dual action linear actuators 70 and 72 receive pneumatic pressure from the pneumatic control system 54.

The pneumatic control system 54 controls the angular positions of the sealing members 66 and 67 such that at a predetermined time after the upper and lower bumpers 56 and 58 and the upper bumper 60 exert a predetermined pressure, such as 50 pounds per square inch, on the bus 10, the pneumatic control system 54 opens the sealing members 66 and 67 relative to the intake opening 16 such that the sealing members 66 and 67 engage the corresponding inner portions of the bus door opening 64. The sealing members 66 and 67 are suitably configured for engaging the interior portions of the bus door opening 64 if the bus doors 14 open outwardly, or for engaging the exposed surfaces of the bus door 14 if the bus door 14 opens inwardly. Sealing members 66 and 67 are made of a flexible material for sealing engagement with either the bus door 14 or the bus door opening 64. The pneumatic control system 54 provides pressurized gas to the dual action linear actuators 70 and 72 such that the dual action linear actuators 70 and 72 cause the sealing members 66 and 67, respectively, to exert a predetermined pressure, such as 30 pounds per square inch, against any object which resists opening movement of the sealing members 66 and 67 relative to the intake opening 16. The pressure which the sealing members 66 and 67 exert against the bus doors 14 or the bus door opening 64 is sufficient to form an adequate seal therebetween without causing injury to the operator if portions of his body should inadvertently be in the path of the sealing members 66 and 67 as they move to engage the bus 10.

A shear pin 104 retains the housing 18 against rotation about the pivot pin 20 whenever a torque less than a predetermined value is applied to the housing 18 about the pivot pin 20. Thus the housing 18 remains fixed relative to the plate 22 unless an excessive torque is applied to the housing, with the bus 10. The pivot pin 20 and shear pin 73, therefore, permit the housing 18 to rotate away from the bus 10 if the bus 10 should begin to roll while the sealing members 66 and 67 are engaged therewith, thereby preventing damage to both the bus 10 and the bus cleaner system 12.

Referring to FIG. 8, upon actuation, the start switch 61 which is connected to a pneumatic pressure source 74, connects a pneumatic signal to an input a of a flip flop 75, which provides a control signal through an output c to a double-ported control valve 76. After receiving the control signal from the flip flop 75, the double-ported control valve 76 provides a pressurized gas to a chamber 78 of the dual action linear actuator 44 to advance the actuator rod 50, which moves the housing 18 along the rails 24 and 26 toward the bus 10. The control signal output from terminal c of the flip flop 75 is also connected to an input b of a summer 80, which also receives an input from the linear dual action actuator 44. If dual action linear actuator 44 pushes the housing 18 against the bus 10 with a predetermined force, or if the actuator rod 50 has traveled its maximum possible distance out of the actuator housing 48, while input b of the summer 80 receives the control signal output of terminal c of the flip flop 75, then summer 80 provides an output signal for opening the sealing members 66 and 67 at a terminal c to an input terminal a of a flip flop 82. The flip flop 75 provides an output at a terminal d to an input terminal f of the flip flop 82. Simultaneous application of input signals to terminals a and f of the flip flop 82 from the flip flop 75 and the summer 80, respectively, causes the flip flop 82 to output a signal at terminal c to an input terminal b of a summer 84.

The summer 84 has an output terminal c connected to a double-ported control valve 86, which provides a pressurized gas to a pair of chambers 87 and 88 in the dual action linear actuators 70 and 77, respectively to open the sealing members 66 and 67. The double-ported control valve 86 is connected to an input a of a summer 89, which also has an input terminal b which receives a signal from terminal c of a flip flop 90. The flip flops 82 and 90 receive pneumatic pressure from the pneumatic pressure source 74. Output c of the summer 89 is connected to input f of the flip flop 75.

The pneumatic control system 52 includes a reset switch 91 which, when actuated, provides an input signal to a terminal a of an AND gate 94. The AND gate 94 receives a second input at an input terminal b from output terminal c of the flip flop 82. The control signal for opening the sealing members 66 and 67 emanates from output terminal c of the flip flop 82; therefore, the pneumatic control system 52 may be reset after actuation of the start switch 61, which initiates the logic sequence for moving the sealing members 66 and 67 to the open position. Upon receipt of appropriate input signals, the AND gate 94 provides a signal to input terminal a of the flip flop 90. The f terminal of the flip flop 90 receives a signal from the d output terminal of the flip flop 82. The input signal to terminal f of the flip flop 90 is a logic high after the start button 61 has actuated the flip flop 75. Therefore, sequential actuation of the start switch 61 and reset switch 91 causes the flip flop 90 to output a signal to double-ported valve 86 through the summer 84 to vent the chambers 87 and 88 while supplying pneumatic pressure to a pair of chambers 92 and 93 of the dual action linear actuators 70 and 72, respectively to cause the sealing members 66 and 67 to move to the closed position out of engagement with the bus 10. After the sealing members 66 and 67 have moved to the fully closed position, the signal from the summer 89 to the flip flop 75 causes the double-ported control valve 76 to pressurize a chamber 96 of the dual action linear actuator 44 while venting the chamber 78 to retract the actuator rod 50 into the actuator housing 48 to move the housing 18 away from the bus 10.

The bus cleaning system 12 may include a high-pressure hose 98 as shown in FIGS. 1, 2 and 6 connected to a source (not shown) of pressurized air. After properly engaging the sealing members 66 and 67 with the bus 10, the operator sprays high-pressure air from the hose 98 on dust and debris inside the bus 10 to facilitate the cleaning operation.

A fan (not shown) in the housing 18 forces air into the open rear door 15 to create a high velocity air stream through the bus 10 to remove loose dirt and refuse therefrom. A duct 102 connects the housing 18 to a receptacle 104 which collects material removed from bus 10. The receptacle 104 is normally stationary relative to the bus 10 being cleaned; therefore a flexible duct section 106 shown in FIG. 1 connects the housing 18 to the duct 102 to permit movement of the housing 18 relative to the receptacle along the rails 24 and 26.

Although the invention has been described in some detail by way of illustration and example for purposes of clarity and understanding, it is understood that certain changes and modifications may be made within the spirit of the invention and scope of the appended claims.

What is claimed is:

1. A system for removing loose materials from a vehicle or the like having first and second openings at substantially opposite ends thereof, comprising:
    a housing having an intake chamber and means for creating an airflow therein, said housing having a duct opening for admitting air into said intake chamber in response to said airflow means;
    a first sealing member mounted to said housing adjacent a first edge of said duct opening;
    a second sealing member mounted to said housing adjacent a second edge of said duct opening; and
    means for engaging said first and second sealing members with the vehicle against opposite interior sides of the first opening so that air forced through the second opening by said airflow means carries loose material from the vehicle through the first opening and the engaged duct opening, into said intake chamber.

2. A system according to claim 1 wherein said engaging means includes:
    means for positioning said duct opening adjacent the first opening of the vehicle; and
    means for controlling the angular positions of said first and second sealing members.

3. A system according to claim 2 wherein said sealing member comprises a sealing flap, and said controlling means includes:
    a first pneumatic actuator connected to said first sealing member;
    a second pneumatic actuator connected to said second sealing member; and
    means for supplying pneumatic pressure to said first and second pneumatic actuators to move said first and second sealing members between an open position, wherein said first and second members are engaged with the vehicle to form a seal with the sides of said first opening, and a closed position, wherein said first and second sealing members are disengaged from said vehicle.

4. A system according to claim 3 further including:
    a base;
    a pair of rails mounted to said base;
    means for mounting said housing on said pair of rails for movement thereon relative to said base; and
    means for moving said intake chamber relative to said pair of rails.

5. A system according to claim 4 wherein said moving means comprises:
    a third pneumatic actuator connected between said base and said housing; and
    means for supplying pneumatic pressure to said third dual action linear pneumatic actuator.

6. A system according to claim 5 further comprising:
    a plate mounted to said rails, said third dual action linear pneumatic actuator being connected to said plate to move said plate along said rails;
    means for pivotally mounting said housing to said plate; and
    means for retaining said housing against rotation relative to said base upon application of less than a predetermined torque to said housing about said pivotal mounting means.

7. A system according to claim 6 wherein said pivotal mounting means comprises a pivot pin.

8. A system according to claim 6 wherein said retaining means comprises a shear pin.

9. A system according to claim 5 further including means for controlling the pneumatic pressure to said third pneumatic actuator to urge said housing against the vehicle with a predetermined pressure.

10. A system according to claim 9 further including means for controlling the pneumatic pressure to said first and second pneumatic actuators to move said first and second sealing members from the closed position to the open position after said third pneumatic actuator urges said housing against the vehicle.

11. A method for cleaning a vehicle interior having more than one opening therein, comprising the steps of:
    providing a housing having a plurality of sealing members attached to an air intake opening formed in said housig;
    inserting a plurality of sealing members into one of said vehicle openings;
    moving the sealing members into engagement with the inner portions of the opening to form a seal therewith; and
    removing air from said housing so that air may be drawn through the air intake opening and the engaged vehicle opening to remove material from the vehicle.

12. A method for cleaning a vehicle interior having an opening therein, comprising the steps of:
    mounting a pair of sealing members to a housing provided with airflow means;
    inserting the pair of sealing members into the opening; and
    forming a seal between inner portions of the opening and the pair of sealing members to draw air through the opening to remove material from the vehicle in response to said airflow means.

13. A method according to claim 12, further including the steps of:
    urging the housing against the vehicle with a predetermined force; and moving the sealing members into engagement with the opening after the housing is urged against the vehicle with the predetermined force.

14. A method according to claim 13, further including the step of mounting the housing on rails for movement of the housing relative to the vehicle.

15. A system for removing loose materials from a vehicle or the like, having first and second openings at substantially opposite ends thereof, comprising:
   a base;
   a housing having an intake chamber and airflow generating means therein, said housing having a duct opening for admitting air into said intake chamber and a plurality of sealing members attached to said duct opening for engaging with interior portions of the first vehicle opening so that air entering the vehicle through the second opening carries loose material out of the first opening into said intake chamber engaged thereto;
   means for rotatably mounting said housing on said base; and
   means for retaining said housing against rotation relative to said base upon application of less than a predetermined torque to said housing about said mounting means.

16. A method for cleaning a vehicle interior having an opening therein, comprising the steps of:
   mounting a pair of sealing members to a housing;
   urging the housing against the vehicle with a predetermined force;
   moving the sealing members into engagement with inner portions of the vehicle opening after the housing is urged against the vehicle with the predetermined force; and
   removing air from the housing, causing air and any entrained dust and debris to flow through the interior of the vehicle and out into the engaged housing.

17. A system for removing loose materials from a vehicle or the like, having an opening therein, comprising:
   means for contacting an airflow generating means to an exterior portion of the vehicle adjacent the opening;
   means for sensing contact between said contacting means and said vehicle exterior; and
   means for forming a seal between said airflow generating means and inner portions of the opening in response to said sensing means.

* * * * *